United States Patent [19]

Ohta et al.

[11] Patent Number: 4,839,251
[45] Date of Patent: Jun. 13, 1989

[54] PHOTO-MASK FOR USE IN MANUFACTURING AN OPTICAL MEMORY DISC, A METHOD FOR MAKING THE PHOTO-MASK AND A METHOD FOR MANUFACTURING THE OPTICAL MEMORY DISC

[75] Inventors: Kenji Ohta; Akira Takahashi; Tetsuya Inui, all of Nara; Junji Hirokane, Tenri; Hiroyuki Katayama, Ikoma, all of Japan

[73] Assignee: Sharp Kabushiki Kaisha, Osaka, Japan

[21] Appl. No.: 36,426

[22] Filed: Apr. 9, 1987

[30] Foreign Application Priority Data

Apr. 11, 1986 [JP] Japan .................................. 61-84448

[51] Int. Cl.⁴ .............................................. G03F 1/00
[52] U.S. Cl. .................................. 430/5; 430/321; 428/65
[58] Field of Search ..................... 430/5, 321, 945; 428/65, 138; 369/275, 277, 284, 285

[56] References Cited

U.S. PATENT DOCUMENTS 4,423,137 12/1983 Rester .................................. 430/320
4,586,173 4/1986 Ando .................................. 369/275

FOREIGN PATENT DOCUMENTS 108258 5/1984 European Pat. Off. ............ 369/275
61-107549 5/1986 Japan .................................. 369/277

Primary Examiner—José G. Dees
Attorney, Agent, or Firm—Birch, Stewart, Kolasch & Birch

[57] ABSTRACT

A photo-mask for use in manufacturing an optical memory disc has a substrate having a disc shape and made of a transparent material, and a film deposited on the substrate and formed with a predetermined pattern of grooves extending spirally or concentrically to the center of the disc shaped substrate such as to leave a thin film at the bottom of the grooves, and a number of microscopic pits in the form of minute indentations with a predetermined spacing aligned along the grooves so as to substantially leave no film at the bottom of the indentations. Thus, a light which has passed through the thin film at grooves is weakened and a light which has passed through the indentations loses substantially no power, and a light applied elsewhere on the film is cut off. The photo-mask is made through the steps of depositing an opaque film on a substrate having a disc shape and made of a transparent material, impinging a first laser at places where the grooves are to be formed, and impinging a second laser at places where the pits are to be formed. The first laser is weaker in power than the second laser.

10 Claims, 3 Drawing Sheets

PHOTO-MASK FOR USE IN MANUFACTURING AN OPTICAL MEMORY DISC, A METHOD FOR MAKING THE PHOTO-MASK AND A METHOD FOR MANUFACTURING THE OPTICAL MEMORY DISC

CROSS REFERENCE TO THE RELATED APPLICATION

This application relates to U.S. patent application Ser. No. 017,456, filed Feb. 24, 1987, Kenji OHTA et al., entitled "Method of Manufacturing Optical Memory Element" now U.S. Pat. No. 4,778,747, which is a continuation of U.S. patent application Ser. No. 712,205, filed Mar. 15, 1985, which is now abandoned. Both applications are assigned to the same assignee as the present application.

BACKGROUND OF THE INVENTION

1. Field of the Invention

The present invention relates to a method for manufacturing an optical memory element, such as an optical memory disc, also to a photo-mask used in the disc manufacturing step, and further to a method for making the photo-mask.

2. Description of the Prior Art

Recently, the need for the optical memory discs has increased remarkably, because of their high density and high capacity memory ability. Optical memory discs can be divided into three types: a read-only type which can only reproduce the recorded data; a read/add type which can reproduce the recorded data and also add further data, but can not erase the original or the added data; and a read/write type which can reproduce, erase and record data freely.

As shown in FIG. 1, the discs of the read/add type and the read/write type are previously provided with guide tracks 111 for guiding an area to be recorded, and address indications 112 defined by a number of microscopic pits in the form of minute indentations spaced along the spiral or concentric guide tracks for indicating the addresses of the guide tracks. In the case where each guide track is divided into a number of sectors, sector indications are further provided in the form of indentations.

A prior art method for manufacturing the optical memory disc is disclosed, for example, in Japanese patent laid-open publication No. 60-195751 (corresponding to the above-mentioned U.S. patent application Ser. No. 017,456, filed Feb. 24, 1987, Kenji OHTA et al., entitled "Method of Manufacturing Optical Memory Element") assigned to the same assignee as the present application. The prior art method is briefly described hereinbelow in connection with FIGS. 2a-2e.

First, a glass disc 100 having no track or no indentation is deposited with a photoresist film 101 using a spinner, or the like (FIG. 2a). Then, a photo-mask M defined by a transparent plate 102 and opaque film 105 having a predetermined pattern and made of, e.g., Cr or Ta is placed on the photoresist film 101 and, thereafter, the photoresist film is exposed by light, such as ultraviolet light UV (FIG. 2b). Then, the photoresist is developed in a certain agent so as to remove the photoresist which has been exposed by the light and for the nonexposed areas to remain (FIG. 2c). Thereafter, a reactive ion etching is carried out in a chamber filled with $CF_4$ or $CHF_3$ gas, or instead, a wet etching is carried out in a pool filled with HF liquid, so as to form guide tracks 111 and indentations 112 in the glass disc 100 (FIG. 2d). Finally, the remaining photoresist is removed by solvent such as acetone, or by sputtering in $O_2$ plasma so as to produce a glass disc formed with guide tracks and indentations (FIG. 2e).

In the prior art method as described above, the photo-mask M is formed by the following steps.

As shown in FIG. 3, the transparent plate 102 in a shape of disc is deposited with an opaque film 105 and further with a photoresist film 108. Then, while rotating the disc about its center, an Ar laser beam 110 converged by a lens system 109 impinges on the photoresist film 108. A continuous laser beam is produced when tracing the guide tracks and an intermittent laser beam is produced when tracing the places where the indentations are to be formed. Thereafter, the photoresist film is partly removed in a pattern corresponding to the laser beam impingement. Then, by a certain agent, opaque film 105 is etched according to the pattern, and the remaining photoresist is removed, thereby producing the photo-mask M.

According to the prior art manufacturing steps shown in FIGS. 2a-2e, the guide tracks and the indentations will have the same depth. However, according to a recent technical development, it has been found that it is preferable to make the depth D1 at guide tracks smaller than the depth D2 at indentations, as depicted in FIG. 1, so as to improve the signal recording quality. For example, when the tracks are traced by a light beam having a wavelength of $\lambda$ ($\lambda=7800$ Å or 8300 Å) so as to read/write the disc through diffraction differential system, it is preferable to make the depth D1 approximately equal to $\lambda/8n$ (n is a refractive index of the substrate 100), and the depth D2 approximately equal to $\lambda/4n$.

Thus, problem is that the prior art manufacturing steps as shown in FIGS. 2a-2e will not result in the optical memory disc shown in FIG. 1.

SUMMARY OF THE INVENTION

The present invention has been developed with a view to substantially solving the above described problem and has for its essential object to provide a method for manufacturing an optical memory disc having a different depth between the guide track and the indentations.

It is also an essential object of the present invention to provide a photo-mask used in the disc manufacturing step.

It is a further object of the present invention to provide a method for making the photo-mask.

In accomplishing these and other objects of the present invention, a photo-mask according to the present invention has a substrate having a disc shape and made of a transparent material, and a film deposited on the substrate and formed with a predetermined pattern of grooves extending spirally or concentrically to the center of the disc shaped substrate so as to leave a thin film at the bottom of the grooves, and a number of microscopic pits in the form of minute indentations with a predetermined spacing aligned along the grooves so as to substantially leave no film at the bottom of the indentations. Thus, a light which has passed through the thin film at grooves is weakened and a light which has passed through the indentations loses substantially no power, and a light applied elsewhere on the film is cut off.

Also a method for making the photo-mask according to the present invention comprises the steps of depositing an opaque film on a substrate having a disc shape and made of a transparent material, impinging a first laser at places where the grooves are to be formed, and impinging a second laser at places where the pits are to be formed. The first laser is weaker in power than the second laser.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Figure 1:
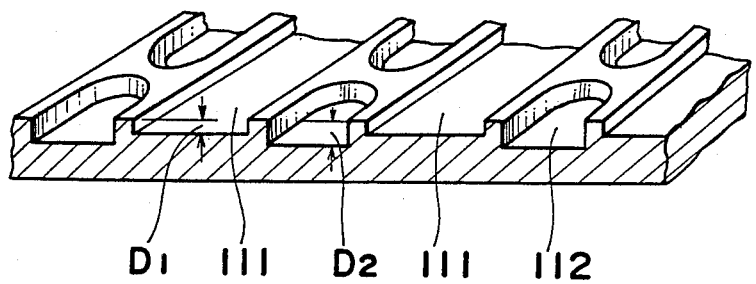
FIG. 1 is a fragmentary view of an optical memory disc with different depths according to prior art.
Figure 2A:
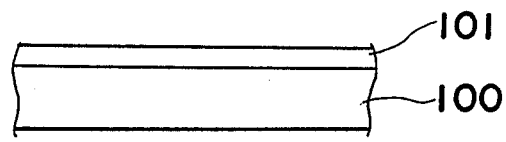
FIGS. 2a-2e are diagrammatic views showing steps, according to prior art, for manufacturing the optical memory disc with the same depth.
Figure 2B:
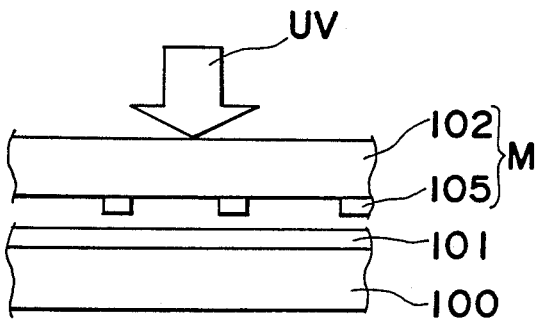
Figure 2C:
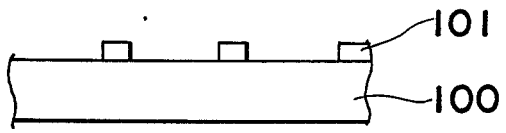
Figure 2D:
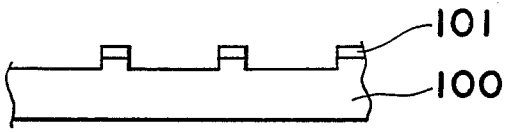
Figure 2E:
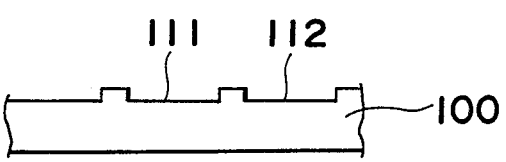
Figure 3:
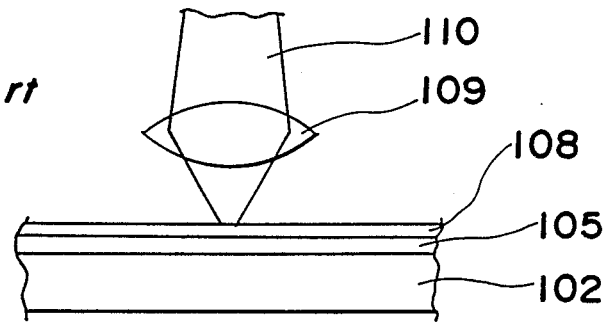
FIG. 3 is a schematic view showing a method for making a photo-mask used in the step of FIG. 2b.
Figure 4:
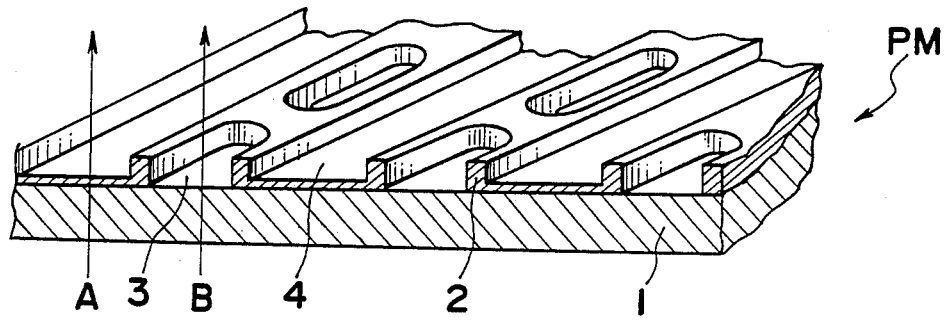
FIG. 4 is a fragmentary view of a photo-mask according to the present invention.

Referring to FIG. 4, a fragmentary view of a photo-mask PM, according to the present invention, for use in the disc manufacturing step is shown. The photo-mask PM has a disc shape and comprises a substrate 1 made of a transparent material, such as a glass ($SiO_2$), or plastic (PMMA), and a film 2 made of an opaque material, such as Cr, Ti, Ta, Nb, Ni, etc. Film 2 is formed with a predetermined pattern of grooves 4 extending spirally or concentrically to the center of the disc, and a number of microscopic pits in the form of minute indentations 3 with a predetermined spacing aligned along the grooves 4. As is apparent from FIG. 4, a very thin film is still left at the bottom of grooves 4, whereas substantially no film is left at the bottom of indentations 3. It is possible to leave a very thin film, thinner than the film at groove 4, at the bottom of indentations 3. Accordingly, a light A which has passed through the thin film at grooves 4 and a light B which has passed through indentations 3 will become different in the intensity such that light A is weakened, for example, to about half the intensity of the light B. Also, the light applied elsewhere on the film is cut off.

Figure 5:
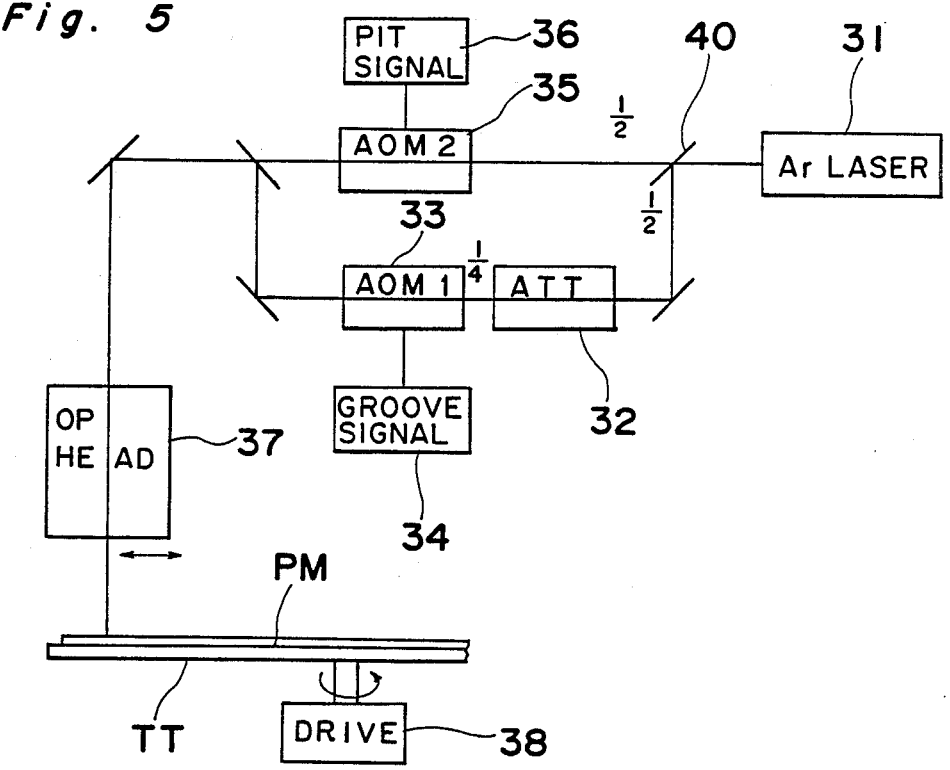
FIG. 5 is a schematic view showing a system for making the photo-mask of FIG. 4.

Referring to FIG. 5, a system for making the photo-mask PM is shown. An Ar laser generator 31 produces Ar laser which is split into halves by a half mirror 40. One laser beam from half mirror 40 is directed to an attenuator 32 at which the laser beam is weakened to half. Thus, the laser beam produced from attenuator 32 is about ¼ of the original laser beam power. The laser beam from attenuator 32 is applied to an acoustooptic modulator 33 which controls ON and OFF of the laser beam passing therethrough in accordance with a groove signal obtained from a groove signal source 34. Thus, acoustooptic modulator 33 produces a continuous laser beam for making the grooves 4.

On the other hand, the other laser beam from half mirror 40 is directed to an acoustooptic modulator 35 which controls ON and OFF of the laser beam passing therethrough in accordance with a pit signal obtained from a pit signal source 36. Thus, acoustooptic modulator 35 produces an intermittent laser beam for making the pits.

It is to be noted that when acoustooptic modulator 33 is producing a continuous laser beam no laser beam will be produced from acoustooptic modulator 35, and when acoustooptic modulator 35 is producing an intermittent laser beam no continuous laser beam will be produced from acoustooptic modulator 33.

The continuous and the intermittent laser beams are both directed, at different time periods, to an optical head 37 through suitable mirrors. Optical head 37 is positioned above a turntable TT driven by a drive motor 38, and is so arranged to move in the radial direction of the turntable and has a function of focusing the laser beam on an photo-mask PM placed on turntable TT.

Referring to FIGS. 6a-6e, a method for manufacturing the optical memory disc according to the present invention is shown.

Figure 6A:
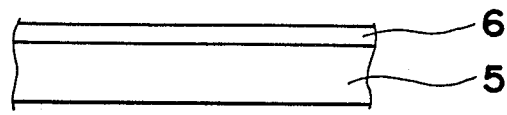
FIGS. 6a-6e are diagrammatic views showing steps, according to the present invention, for manufacturing the optical memory disc with different depth.
Figure 6B:
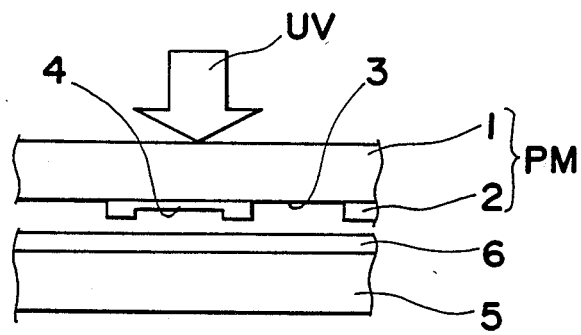
Figure 6C:
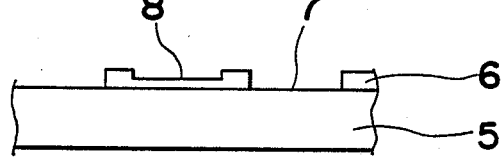

First, a glass disc 5 having no track or no indentation is deposited with a photoresist film 6 using a spinner, or the like (FIG. 6a). Then, photo-mask PM, which has been made in the system shown in FIG. 5, is placed on the photoresist film 6 and, thereafter, the photoresist film is exposed by light, such as ultraviolet light UV (FIG. 6b). The ultraviolet light UV passing through the areas 3 loses hardly any power, thus resulting in the full power exposure on the photoresist film 6, but the same passing through the areas 4 loses about ½ of its power, thus resulting in the half power exposure on the photoresist film 6.

Figure 7:
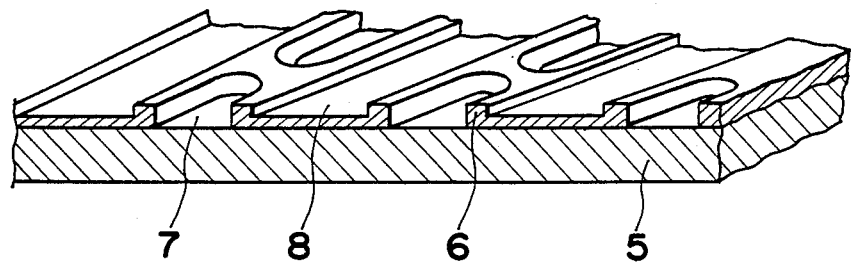
FIG. 7 is a fragmentary view of an intervening product obtained at the step shown in FIG. 6c.

Then, the photoresist film 6 is developed in a certain agent so as to remove the photoresist (FIG. 6c) such that the photoresist is removed by its entire thickness where the full power exposure has been effected, and by 1/n (n is greater than 1 and preferably about 2) of its thickness where the half power exposure has been effected. No removal of the photoresist is effected at the non-exposed areas. Thus, an intervene product at the step shown in FIG. 6c may be depicted as shown in FIG. 7.

Figure 6D:
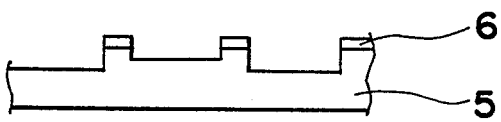

Thereafter, a reactive ion etching is carried out in a chamber filled with $CF_4$ or $CHF_3$ gas, or instead, a wet etching is carried out in a pool filled with HF liquid (FIG. 6d). Since there is no photoresist film left in the areas where pits are to be formed, the etching into the glass is effected from the beginning of the step. However, in the areas where grooves are to be formed, there is some photoresist film left, so that the etching into the glass can be effected some time after the beginning of the step. Accordingly, there will be a difference in the depth between the grooves and the pits such that the pits will be deeper than the grooves.

Figure 6E:
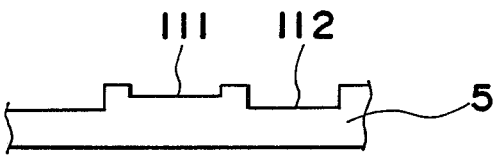

Finally, the remaining photoresist is removed by solvent such as acetone, or by sputtering in $O_2$ plasma so as to produce a glass disc formed with shallow guide tracks and deep indentations (FIG. 6e).

In the embodiment described above, the width of the tracks and indentations can be selected to any desired size. Also, the edges of the grooves and indentations are shown as perpendicular to the bottom face of the disc, but they can be slanted. The thickness of the film 2 can be selected to any desired size. For example, the thickness of the film 2 is originally about 600–700 Å, the thickness of the film 2 where the guide groove 4 is formed is about 50–150 Å. It is possible for some photoresist layer to remain in the pits 3, such as at the thickness of about 50 Å.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A photo-mask for use in manufacturing an optical memory disc, said photo-mask consisting essentially of:
    a substrate having a disk shape and made of a transparent material; and
    a film deposited on said substrate, said film comprising a predetermined pattern of grooves extending spirally or concentrically to the center of the disc shaped substrate wherein said grooves include a thin portion of said film at the bottom of said grooves, and a number of microscopic pits in the form of minute indentations with predetermined spacing so as to be aligned along said grooves wherein said indentations include no film at the bottom of said indentations,
    whereby light which passes through said thin film at the bottom of said grooves is weakened and light which passes through said indentations loses substantially no power, and light which is applied elsewhere on said film is cut off,
    wherein said film is made of a material selected from the group consisting of Cr, Ti, Ta, Nb and Ni.

2. A photo-mask for use in manufacturing an optical memory disc, said photo-mask consisting essentially of:
    a substrate having a disc shape and made of glass; and
    a film deposited on said substate, said film comprising a predetermined pattern of grooves extending spirally or concentrically to the center of the disc shaped substrate wherein said grooves include a thin portion of said film at the bottom of said grooves, and a number of microscopic pits in the form of minute indentations with predetermined spacing so as to be aligned along said grooves wherein said indentations include no film at the bottom of said indentations,
    whereby light which passes through said thin film at the bottom of said grooves is weakened and light which passes through said indentations loses substantially no power, and light which is applied elsewhere on said film is cut off,
    wherein said film is made of a material selected from the group consisting of Cr, Ti, Ta, Nb and Ni.

3. A photo-mask as claimed in claim 2, wherein the thickness of said film is about 600–700 Å, and the thickness of said film at the bottom of said grooves is about 50–150 Å.

4. A photo-mask for use in manufacturing an optical memory disc, said photo-mask comprising:
    a substrate having a disc shape and made of plastic; and
    a film deposited on said substrate, said film comprising a predetermined pattern of grooves extending spirally or concentrically to the center of the disc shaped substrate wherein said grooves include a thin portion of said film at the bottom of said grooves, and a number of microscopic pits in the form of minute indentations with predetermined spacing so as to be aligned along said grooves wherein said indentations included no film at the bottom of said indentations,
    whereby light which passes through said thin film at the bottom of said grooves is weakened and light which passes through said indentations loses substantially no power, and light which is applied elsewhere on said film is cut off,
    wherein said film is made of a material selected from the group consisting of Cr, Ti, Ta, Nb and Ni.

5. A photo-mask as claimed in claim 4, wherein the thickness of said film is about 600–700 Å, and the thickness of said film at the bottom of said grooves is about 50–150 Å.

6. A method for making a photo-mask for use in manufacturing an optical memory disc, said photo-mask consisting essentially of,
    a substrate having a disc shape and made of a transparent material; and
    a film deposited on said substrate, said film comprising a predetermined pattern of grooves extending spirally or concentrically to the center of the disc shaped substrate wherein said grooves include a thin portion of said film at the bottom of said grooves, and a number of microscopic pits in the form of a minute indentations with predetermined spacing so as to be aligned along said grooves wherein said indentations include no film at the bottom of said indentations,
    whereby light which passes through said thin film at the bottom of said grooves is weakened and light which passes through said indentations loses substantially no power, and light which is applied elsewhere on said film is cut off, said method for making a photo-mask comprising the steps of:
    depositing an opaque film on a substrate having a disc shape and a made of a transparent material;
    impinging a first laser on said film to form said grooves; and
    impinging a second laser on said film to form said pits, said first laser being weaker in power than said second laser.

7. A method for making a photo-mask as claimed in claim 6, wherein said substrate is made of glass.

8. A method for making a photo-mask as claimed in claim 6, wherein said substrate is made of plastic.

9. A method for making a photo-mask as claimed in claim 6, wherein said film is made of a material selected from the group consisting of Cr, Ti, Ta, Nb and Ni.

10. A method for making a photo-mask as claimed in claim 6, wherein the thickness of said film is about 600–700 Å, and the thickness of said film at the bottom of said grooves is about 50–150 Å.

* * * * *